F. WENGER.
WINDMILL.
APPLICATION FILED JAN. 24, 1914.
1,133,595.
Patented Mar. 30, 1915.
2 SHEETS—SHEET 1.
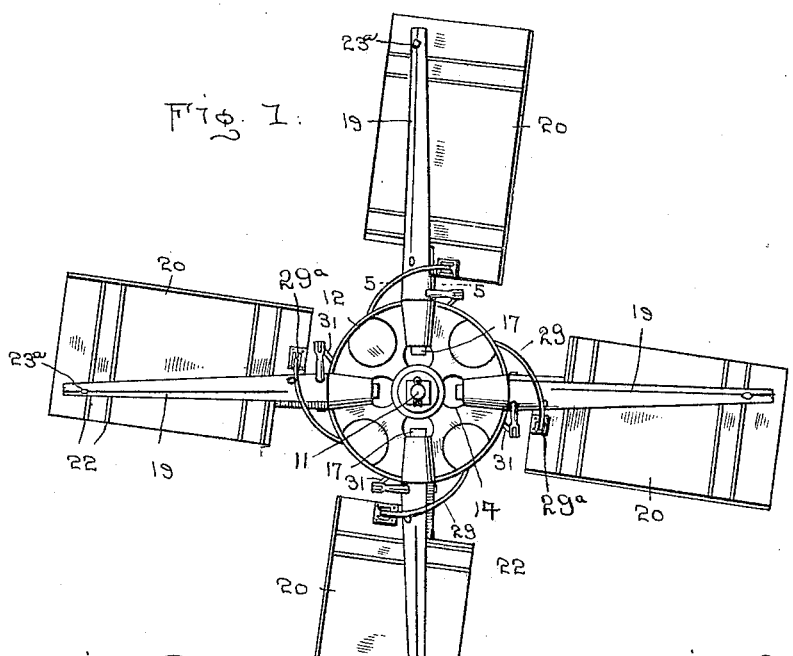
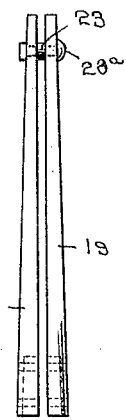
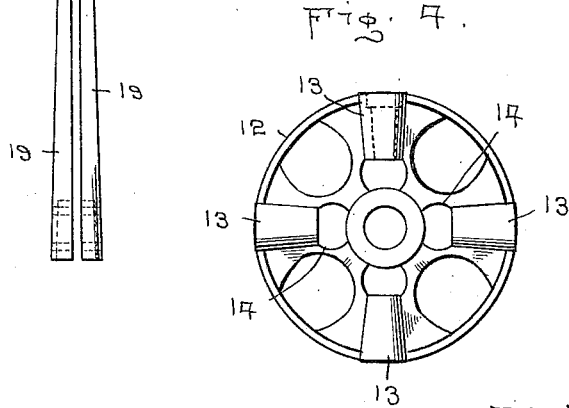
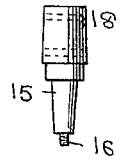
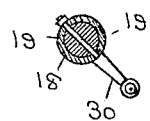
Witnesses
Inventor
F. Wenger
By W. T. Fitzgerald & Co
Attorneys

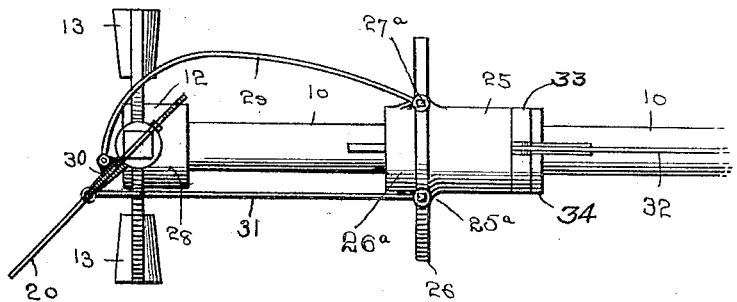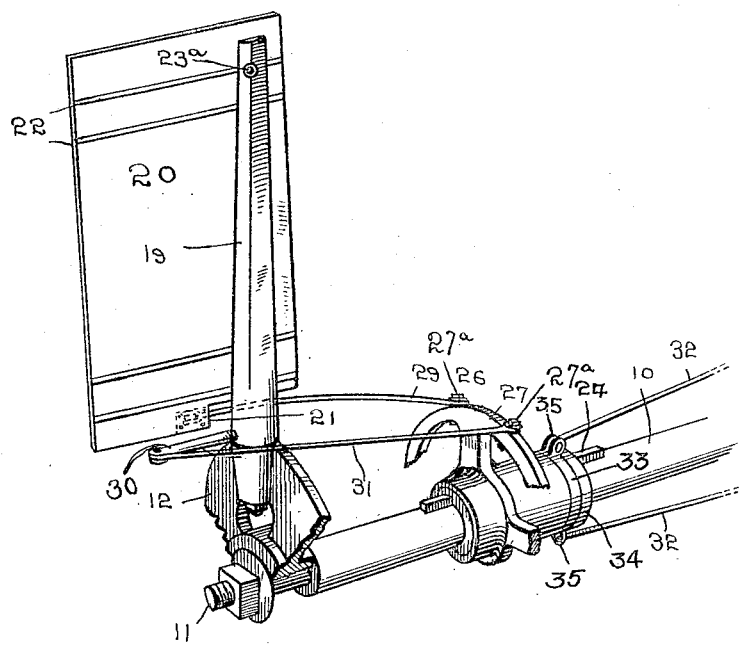

UNITED STATES PATENT OFFICE.

FREDERICK WENGER, OF DRESDEN, KANSAS.

WINDMILL.

1,133,595.   Specification of Letters Patent.   Patented Mar. 30, 1915.

Application filed January 24, 1914. Serial No. 814,189.

*To all whom it may concern:*

Be it known that I, FREDERICK WENGER, a citizen of the United States, residing at Dresden, in the county of Decatur and State of Kansas, have invented certain new and useful Improvements in Windmills; and I do hereby declare the following to be a full, clear, and exact description of the invention, such as will enable others skilled in the art to which it appertains to make and use the same.

The object of this invention is the provision of a wind mill having pivoted blades or vanes and coöperating devices for automatically moving the blades to a position offering the minimum resistance to the passing wind, when the mill exceeds a predetermined speed.

In the accompanying drawings wherein is shown an approved and practical embodiment of the invention, Figure 1 represents a front elevation of the wheel of my improved wind mill. Fig. 2 represents the side elevation of a pair of supporting arms detached from the wheel and blade. Fig. 3 represents a side elevation of the securing member of the arms. Fig. 4 represents a side elevation of the hub of the windwheel. Fig. 5 represents a sectional view on the line 5—5 of Fig. 1. Fig. 6 represents a top plan view of the mill with parts thereof removed, and, Fig. 7 represents a perspective view partly broken away, showing one of the blades of the wheel and coöperating devices in inoperative position.

Referring to the drawings in detail, the numeral 10 indicates the main shaft of the wind mill mounted in a suitable tower or other support, not shown, and having one end reduced and threaded for receiving the hub 12 of the wheel. The hub 12 is formed with a plurality of sockets 13 having bores extending radially of the hub, and terminating at their inner ends in openings 14 extending transversely through the body of the hub. Each socket 13 rotatably receives a shank 15 having the inner end 16 reduced and threaded and projecting into one of the openings 14. The threaded ends 16 receive securing nuts 17, and the opposite ends of the shanks 15 are formed with cylindrical heads 18 adapted to be received within recesses formed in the inner ends of the pairs of arms 19, which latter are normally retained in spaced relation at their outer ends by an interposed sleeve 23 and securing bolt 23$^a$. The blades 20 of the wheel are preferably of rectangular and substantially plane formation having one of the inner corners cut away to provide a shoulder 21 and having transverse corrugations 22 to strengthen them. The blades 20 are movably disposed between the arms of each pair 19 and are pivoted adjacent their outer ends and one longitudinal edge on the sleeve 23.

The shaft 10 is provided with a longitudinal rib 24, a groove in the sleeve 25 fits loosely over the rib 24 permitting the sleeve 25 to slide longitudinally on the shaft 10 but preventing it from rotating around the said shaft. The sleeve 25 is provided with an integral flange 25$^a$ constituting an abutment for a wheel 26 rotatably mounted on said sleeve and prevented from moving longitudinally thereon by a collar 26$^a$ threaded thereon. The rim 27 of the wheel 26 is formed with a plurality of radial bores in which are disposed bolts or the like 27$^a$ pivotally securing one end of curved links or rods 29, the opposite ends of which are pivotally connected at 29$^a$ to the inner ends of the blades 20. A rod or link 31 connects a laterally projecting arm 30 carried by each pair of arms 19 with a bolt 27$^a$ of the wheel 26. A collar 33 is loosely fitted in a groove cut in the sleeve 25 adjacent the rear end thereof, when forming the said groove the flange 34 is also formed, said flange holding the said collar in operative position in said groove and permits the sleeve 25 to turn within the collar 33, and yet said collar is moved longitudinally with the sleeve 25. On opposite sides of the collar 33 lugs 35 are formed, integrally therewith, and the controlling rods 32 are pivotedly connected therewith.

As shown in Figs. 1 and 6 of the drawings, the blades 20 are disposed so as to offer considerable resistance to the passing wind, and consequently the rotative effect of the latter on the wheel is substantially at the maximum. However, should the load carried by the wind mill be materially decreased or the velocity of the wind increased so as to rotate the wheel in excess of a predetermined velocity, centrifugal force acting upon the blades 20 will tend to throw the latter outwardly on their axis 23$^a$ and draw the wheel 26 toward the hub 12 through the link 29. As the wheel 26 thus moves under the influence of the blades 20, it is obvious that the rods or links 31 will be moved longitudinally with said wheel and push against the arms 30, consequently rotating the arms 19 together with the blades 20 to the position shown in Fig. 7 offering the minimum resistance to the passing wind.

While I have here shown and described the preferred embodiment of my invention, I hereby reserve the right to make such alterations and variations therein from time to time as I may deem expedient and which will not depart from the spirit of this invention or conflict with the scope of the claims.

What I claim is:—

1. The combination with a shaft, of a hub secured to said shaft, having a plurality of sockets; a sleeve slidably mounted on said shaft; a wheel rotatively mounted on said sleeve; a plurality of pairs of arms and means to rotatively mount said arms in said sockets; a plurality of blades pivoted between the pairs of arms; means to operatively connect the said blades with the said rotatively mounted wheel; and additional means to operatively connect said wheel with said arms.

2. The combination with a shaft, of a hub secured to said shaft; rotating arms extending radially from said hub; a sleeve slidably mounted on said shaft; a wheel rotatively mounted on said sleeve; a plurality of blades pivoted at a point adjacent to the corner formed by the outer end and the inside longitudinal edge thereof, to the radially extending arms; laterally projecting arms positioned on the lower ends of the said rotating arms; means for operatively connecting said blades with the wheel on said sleeve and additional means to connect said wheel with the laterally projecting arm.

3. The combination as substantially set forth comprising a plurality of rectangular blades movably disposed on the arms of the wind wheel; a slidably mounted collar on the main shaft, a rotatable wheel and means to mount the same upon said collar, curved rods operatively connecting the lower end of the said blades with said wheel, and also rods connecting said wheel with laterally projecting arms positioned on the lower ends of the said wind wheel arms, whereby the position of the blades is adjusted to the direction of the wind.

In testimony whereof I have signed my name to this specification in the presence of two subscribing witnesses.

FRED. WENGER.

Witnesses:
G. H. POPE,
DON A. KOEHLER.

Copies of this patent may be obtained for five cents each, by addressing the "Commissioner of Patents, Washington, D. C."